(12) United States Patent
Stephens et al.

(10) Patent No.: US 11,821,740 B2
(45) Date of Patent: Nov. 21, 2023

(54) ROUTE GENERATION USING ROAD LANE LINE QUALITY

(71) Applicant: Ford Global Technologies, LLC., Dearborn, MI (US)

(72) Inventors: Brett Stephens, Detroit, MI (US); Jonathan Thomas Mullen, San Jose, CA (US); Shane Elwart, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 17/096,682

(22) Filed: Nov. 12, 2020

(65) Prior Publication Data

US 2021/0080273 A1 Mar. 18, 2021

Related U.S. Application Data

(63) Continuation of application No. 16/422,512, filed on May 24, 2019, now Pat. No. 10,859,388, which is a
(Continued)

(51) Int. Cl.
*G01C 21/34* (2006.01)
*G08G 1/01* (2006.01)
(Continued)

(52) U.S. Cl.
CPC ..... *G01C 21/3453* (2013.01); *G01C 21/3407* (2013.01); *G05D 1/0088* (2013.01);
(Continued)

(58) Field of Classification Search
CPC ............ G01C 21/3453; G01C 21/3407; G01C 21/3461; G01C 21/32; G01C 21/3415;
(Continued)

(56) References Cited

U.S. PATENT DOCUMENTS 8,527,199 B1 * 9/2013 Burnette ................. G01C 21/32
701/425
8,612,138 B2 * 12/2013 Yeh ....................... G09B 29/007
701/409
(Continued)

FOREIGN PATENT DOCUMENTS

| CN | 102636176 A | * | 8/2012 | ............. G01C 21/32 |
| EP | 2518446 A1 | * | 10/2012 | ......... G01C 21/3658 |
| JP | 2001227978 A | * | 8/2001 | ......... G01C 21/3667 |

OTHER PUBLICATIONS

Liu et al. .; "A Smart Map Representation for Autonomous Vehicle Navigation"; 2015 12th Intl. Conf. on Fuzzy Systems and Knowledge Discovery (FSKD); pp. 2308-2313 (Year: 2015).*

*Primary Examiner* — Michael J Zanelli
(74) *Attorney, Agent, or Firm* — David R. Stevens; Stevens Law Group

(57) ABSTRACT

A method for routing a vehicle includes determining, based on roadway section information for two or more potential driving routes for a vehicle, a first route along which a driver assistance feature or an automated driving feature will not be available and a second route along which the driver assistance feature or the automated driving feature will be available. The method further includes providing navigation instructions for the second route to a driver or control system.

20 Claims, 6 Drawing Sheets

700

Identifying One Or More Driving Routes Between A Current Location Of A Vehicle And A Destination
702

Determining A Route Cost For The One Or More Driving Routes Based On Lane Marking Quality Of A Roadway Within A Corresponding Driving Route
704

Selecting A Route Of The One Or More Routes With A Lowest Route Cost
706

Providing Information About The Route To A Driver Or Control System For Following The Route
708

Related U.S. Application Data continuation of application No. 15/796,381, filed on Oct. 27, 2017, now Pat. No. 10,345,111, which is a continuation of application No. 15/148,879, filed on May 6, 2016, now Pat. No. 9,851,212.

(51) Int. Cl.
*G08G 1/0968* (2006.01)
*G05D 1/00* (2006.01)

(52) U.S. Cl.
CPC .......... *G08G 1/012* (2013.01); *G08G 1/0112* (2013.01); *G08G 1/0116* (2013.01); *G08G 1/0129* (2013.01); *G08G 1/0141* (2013.01); *G08G 1/096811* (2013.01); *G08G 1/096827* (2013.01); *G08G 1/096838* (2013.01)

(58) Field of Classification Search
CPC ............ G01C 21/3446; G05D 1/0088; G08G 1/096827; G08G 1/0112; G08G 1/0116; G08G 1/0129; G08G 1/0141; G08G 1/096811; G08G 1/096838; G01S 19/33; G01S 19/45
See application file for complete search history.

(56) References Cited

U.S. PATENT DOCUMENTS

| | | | | |
|---|---|---|---|---|
| 8,700,330 | B2* | 4/2014 | Spindler | G01C 21/32 707/E17.014 |
| 8,929,660 | B2* | 1/2015 | Joshi | G01C 21/32 382/191 |
| 9,188,985 | B1* | 11/2015 | Hobbs | G01C 21/3673 |
| 10,126,430 | B2* | 11/2018 | Matsumoto | G01C 21/3461 |
| 10,300,916 | B2* | 5/2019 | Goto | B60W 30/18154 |
| 10,331,139 | B2* | 6/2019 | Takahashi | G05D 1/0088 |
| 2009/0088978 | A1* | 4/2009 | Ishikawa | G08G 1/096725 701/514 |
| 2013/0013203 | A1* | 1/2013 | Sumizawa | G01C 21/3453 701/533 |
| 2015/0142305 | A1* | 5/2015 | Kubo | G01C 21/3697 701/439 |
| 2015/0260530 | A1* | 9/2015 | Stenborg | G01C 21/3602 701/461 |
| 2015/0345966 | A1* | 12/2015 | Meuleau | G01C 21/3469 701/23 |
| 2015/0345967 | A1* | 12/2015 | Meuleau | G01C 21/3453 701/25 |
| 2016/0305787 | A1* | 10/2016 | Sato | G01C 21/34 |
| 2016/0313133 | A1* | 10/2016 | Zeng | B60W 30/0956 |
| 2017/0010613 | A1* | 1/2017 | Fukumoto | G08G 1/096827 |
| 2017/0219364 | A1* | 8/2017 | Lathrop | G01C 21/36 |
| 2018/0151066 | A1* | 5/2018 | Oba | G05D 1/0285 |

* cited by examiner

502

504

700

```
┌─────────────────────────────────────────────────────────────────────┐
│ Identifying One Or More Driving Routes Between A Current Location   │
│                 Of A Vehicle And A Destination                      │
│                              702                                    │
└─────────────────────────────────────────────────────────────────────┘
                                  │
                                  ▼
┌─────────────────────────────────────────────────────────────────────┐
│ Determining A Route Cost For The One Or More Driving Routes Based   │
│  On Lane Marking Quality Of A Roadway Within A Corresponding        │
│                         Driving Route                               │
│                              704                                    │
└─────────────────────────────────────────────────────────────────────┘
                                  │
                                  ▼
┌─────────────────────────────────────────────────────────────────────┐
│     Selecting A Route Of The One Or More Routes With A Lowest       │
│                           Route Cost                                │
│                              706                                    │
└─────────────────────────────────────────────────────────────────────┘
                                  │
                                  ▼
┌─────────────────────────────────────────────────────────────────────┐
│  Providing Information About The Route To A Driver Or Control       │
│                 System For Following The Route                      │
│                              708                                    │
└─────────────────────────────────────────────────────────────────────┘
```

FIG. 7

ROUTE GENERATION USING ROAD LANE LINE QUALITY

CROSS REFERENCE TO RELATED PATENT APPLICATION

The present application is a continuation of U.S. patent application Ser. No. 16/422,512, filed on May 24, 2019, U.S. patent application Ser. No. 15/796,381, filed on Oct. 27, 2017, and U.S. patent application Ser. No. 15/148,879, filed on May 6, 2016, which are incorporated by references in their entirety.

TECHNICAL FIELD

The disclosure relates generally to methods, systems, and apparatuses for vehicle optimization and more particularly relates to vehicle route generation using road lane line quality.

BACKGROUND

Considerable work is being performed in the automotive and transportation industries to develop, deploy, and enable vehicles that are able to drive themselves without human input or are able to provide assistance to a human driver. Driver assistance systems generally include systems that are or will be able to provide assistance to a human driver including features such as avoidance of impact with other objects (such as pedestrians, other vehicles, or road debris), drive notifications, or assistance in performing a turning, parking, or other maneuver. However, Applicant has recognized that automated driving or assisted driving present considerable challenges to developing robust and safe transportation due to the large variations in driving environments, including variations in driving infrastructure, road materials, lane markings, the presence of other vehicles, pedestrians, or cyclists, or the like.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where:

FIG. 7 is a schematic flow chart diagram illustrating a method for determining a route for a vehicle, according to one implementation.

DETAILED DESCRIPTION

Figure 1:
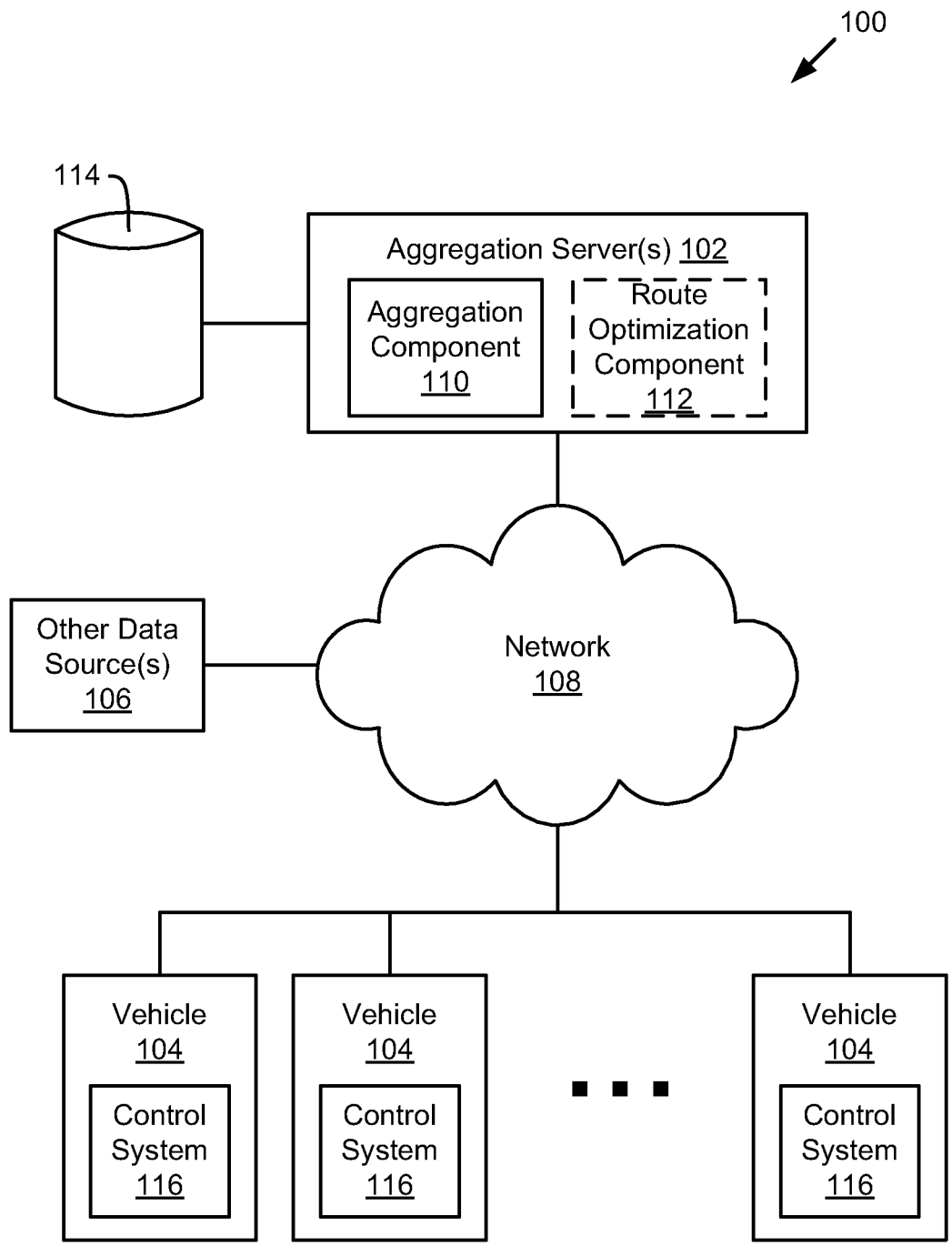
FIG. 1 is a schematic block diagram illustrating a system for optimizing routing of a vehicle, optimizing assisted driving, or optimizing automated driving, according to one implementation.

Considerable work is being performed in the automotive and transportation industries to develop, deploy, and enable vehicles that are able to drive themselves without human input or are able to provide assistance to a human driver. Automated driving systems generally refer to systems that are or will be able to control a vehicle to drive with little or no input from a human. For example, an automated driving system may drive a vehicle from a current location to a destination location without requiring a user to steer, control acceleration, or control breaking. Driver assistance systems generally include systems that are or will be able to provide assistance to a human driver including features such as avoidance of impact with other objects (such as pedestrians, other vehicles, or road debris), drive notifications, or assistance in performing a turning, parking, or other maneuver. However, Applicant has recognized that automated driving or assisted driving present considerable challenges to developing robust and safe transportation due to the large variations in driving environments, including variations in driving infrastructure, road materials, lane markings, the presence of other vehicles, pedestrians, or cyclists, or the like.

Furthermore, Applicant has recognized that some automated driving features or assisted driving features may perform more robustly in some environments than within other environments. For example, some automated driving features or assisted driving features may depend on infrastructure built into a roadway, high quality lane markings, smooth road surfaces, or any other characteristic of a roadway or driving environment to perform in a robust or safe manner. Additionally, some automated driving features may require environments where there are relatively few human drivers, cyclists, or pedestrians.

In recognition and in light of the foregoing, the present disclosure discloses systems, methods, and devices that enable optimization of vehicle driving, including the optimization of vehicle routing. According to one embodiment, a method for routing a vehicle includes identifying one or more driving routes between a current location of a vehicle and a destination. The method includes determining a route cost for the one or more driving routes based on lane marking quality of a roadway within a corresponding driving route. The method includes selecting a route of the one or more routes with a lowest route cost. The method also includes providing information about the route to a driver or control system for following the route.

One example of an assisted driving feature provides lateral and longitudinal control when certain conditions are met. These conditions may include, but are not limited to, road lane marking/line quality, lane presence (e.g., which lane the vehicle is in), and road curvature. The conditions required to provide an assisted driving feature to a driver may be dynamic in that they may differ from one driving environment to another. The conditions required may depend both on the vehicle itself, including any control system or sensors, and its surrounding environment or infrastructure. If a driver or driving system is offered a preview of these vehicle and infrastructure conditions before completing a route, the driver assistance feature may be able to perform in a more robust manner. For example, the driver or driving system may be able to select routes where more reliable automated driving features or driver assistance features can be provided.

According to one embodiment, drive data from a large number of vehicles or other data sources is stored in a connected vehicle and uploaded to a network. For example, vehicles may acquire data about a driving environment using vehicle sensors and upload that data, or any derived data, to a cloud storage location. Users may access the cloud storage location via a network using connected devices (such as a vehicle, computing system, smartphone, or the like) and download relevant data to the vehicle. The data may be stored locally in the vehicle's map database and a routing algorithm may be run against the data in order to optimize vehicle behavior along relevant routes.

Furthermore, with the implementation of driver assistance or automated driving features, there may be a variety of roadways for which a feature's availability is sparse, inconsistent, or nonexistent. For example, some navigation algorithms choose routes based on shortest distance, shortest time, or some other lowest heuristic cost. Applicant has recognized that there may be considerable benefit to choosing a route based on driver assistance availability. In one embodiment, a navigation system or navigation software provides routing that takes driver assistance feature or automated driving feature availability into consideration in creating routes.

According to one example embodiment, lane line or lane marking quality may be of importance to an assisted driving feature or an automated driving feature. A map database or drive history database may store some metric of lane line quality. For example, lane line/marking quality may be stored locally by the vehicle or may be uploaded for storage as part of aggregated data. The map database and/or drive history database may be cloud-based, loaded onto the vehicle at manufacture, and/or created and updated by the vehicle based on probe or sensor data. Using the map or drive history database, a routing algorithm may be performed, which evaluates and prioritizes routes based on a lowest cost. An example cost term associated with lane line quality is:

$$J = \sum_{i=1}^{n} (1 - Q_i), \quad \text{Equation 1}$$

where $Q \in \{0,1\}$ is a Boolean metric for lane quality (0 represents bad lane quality, 1 represents good lane quality). In one embodiment, the map database or drive history database may include metrics in addition to road lane line quality such as road curvature, road lane line geometry, road lane line/marker type (such as indication of a single line, double line, broken line, reflector, or other lane marker type), and/or road lane line/marker color (such as white, yellow, or other color). In one embodiment, the routing algorithm may take these additional metrics or other metrics into account in prioritizing routes. For example, the routing algorithm may take into account other costs such as shortest distance, fastest travel time, traffic conditions, or the like to find a best all-around route based on the various cost factors. In one embodiment, the determination of line quality cost for routing purposes may be a dynamic function that takes weather and traffic into consideration. For example, some types of lane markers may be more or less visible/detectable by vehicle sensors based on time of day or weather conditions.

Referring now to the figures, FIG. 1 is a block diagram illustrating a system 100 for optimizing routing of a vehicle and/or performance of assisted driving and/or automated driving features. The system 100 includes an aggregation server 102 as well as a plurality of vehicles 104 and one or more other data sources 106 that are able to communicate with the aggregation server 102 over a network 108. The aggregation server 102 includes an aggregation component 110 and may also include a route optimization component 112.

The aggregation component 110 may aggregate drive data or other data received from the vehicles 104 and the one or more other data sources 106. For example, the aggregation server 102 may receive infrastructure data, driving environment data, and/or traffic data from the vehicles 104 or other data sources 106. The received data may include information about road bumpiness, a presence of lane markings, a lane marking quality, an indication of vehicle traffic levels, an indication of presence of pedestrians, a road curvature, or an accident history. The aggregation component 110 may combine the received data to generate aggregated data within a data store 114.

The route optimization component 112 may access the aggregated data in the data store 114 to optimize a route or provide aggregated data to one or more of the vehicles 104. For example, the vehicle 104 may use the aggregated data to provide information about a future driving path to a driver or control system 116 to optimize driving of the vehicle 104. The vehicle 104 may also accumulate drive data, including any information about a roadway or driving environment, and send the accumulated drive data to the aggregation server 102 for storage or aggregation. The other data sources 106 may also upload data for aggregation to the aggregation server 102. The other data sources 106 may include systems or sensors for infrastructure such as traffic cameras, vehicle or traffic sensors, weather sensors, or the like. In one embodiment, the route optimization component 112 may determine a driving route that prioritizes driving routes based on whether automated driving or assisted driving will be available to the vehicle. In one embodiment, the route optimization component 112 may be located within one or more of the vehicles 104, such as within the control system 116 of the vehicle. For example, the route optimization component 112 may operate locally on a vehicle 104 and utilize aggregated data stored in the data store 114 in combination with drive history data and/or map data stored locally to the vehicle 104.

Figure 2:
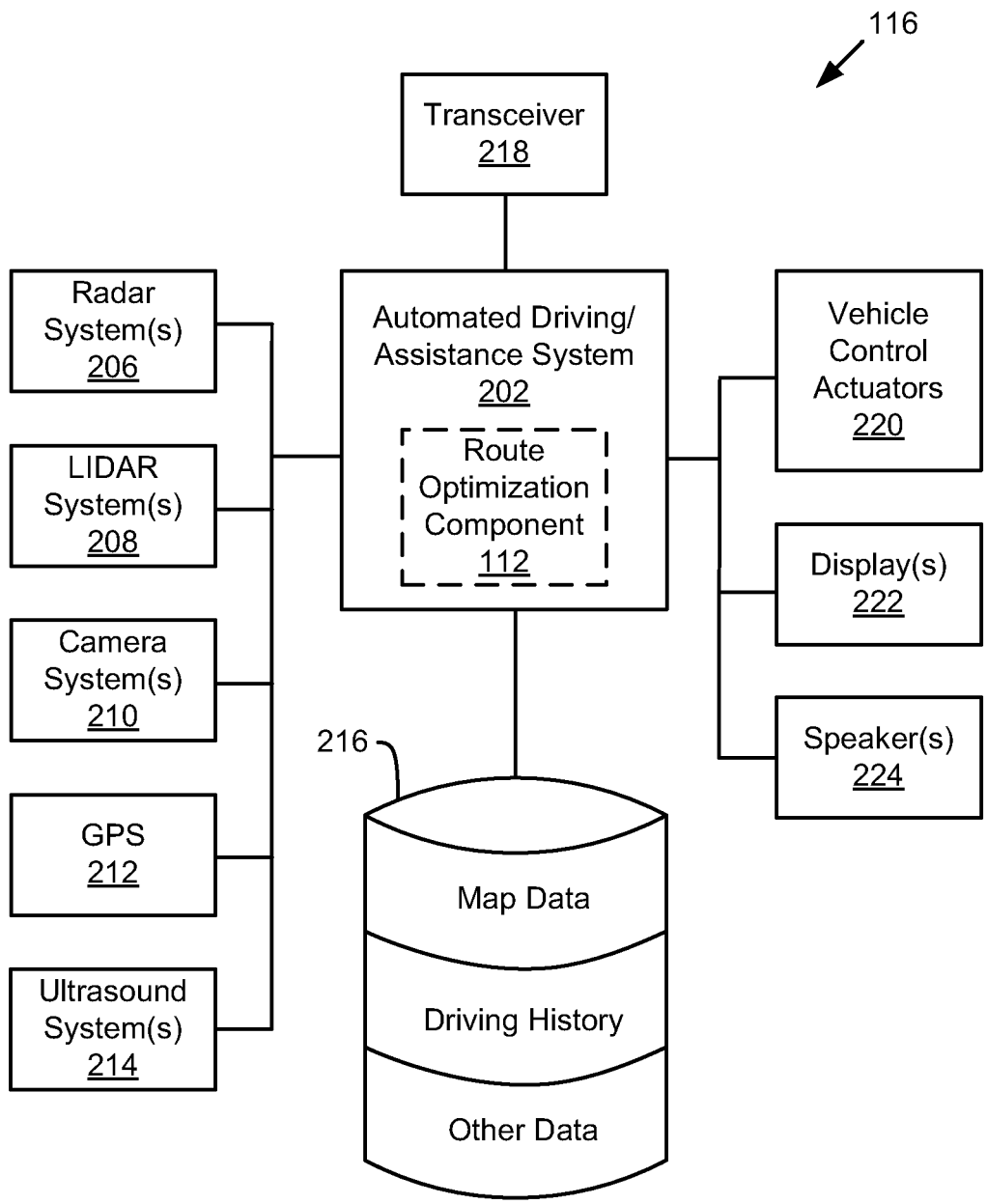
FIG. 2 is a schematic block diagram illustrating an implementation of a vehicle control system that includes an automated driving/assistance system, according to one implementation.

FIG. 2 illustrates an example vehicle control system 116 that may be used to provide automated or assisted driving to a vehicle (such as the vehicles 104 of FIG. 1), including one or more automated driving features or assisted driving features. The vehicle control system 116 may include an automated driving/assistance system 202. The automated driving/assistance system 202 may be used to automate or control operation of a vehicle or to provide assistance to a human driver. For example, the automated driving/assistance system 202 may control one or more of braking, steering, acceleration, lights, alerts, driver notifications, radio, or any other auxiliary systems of the vehicle. In another example, the automated driving/assistance system 202 may not be able to provide any control of the driving (e.g., steering, acceleration, or braking), but may provide notifications and alerts to assist a human driver in driving safely. The automated driving/assistance system 202 may include a route optimization component 112 that may be used to determine routes where automated driving or driving assistance features will operate reliably. For example, the route optimization component 112 may cause a vehicle to be routed along roads or roadways where high quality lane markings are available so that they will be easily detected by one or more sensors of the vehicle control system 116, thus improving reliability of an automated driving feature or assisted driving feature.

The vehicle control system 116 may also include one or more sensor systems/devices for detecting a presence of nearby objects, lane markers, and/or or determining a location of a parent vehicle (e.g., a vehicle that includes the vehicle control system 116). For example, the vehicle control system 116 may include one or more radar systems 206, one or more LIDAR systems 208, one or more camera systems 210, a global positioning system (GPS) 212, and/or one or more ultra sound systems 214. The vehicle control system 116 may include a data store 216 for storing relevant or useful data for navigation and safety such as map data, driving history, or other data. The vehicle control system 116 may also include a transceiver 218 for wireless communication with a mobile or wireless network, other vehicles, infrastructure, or any other communication system (such as the aggregation server 102 of FIG. 1).

The vehicle control system 116 may include vehicle control actuators 220 to control various aspects of the driving of the vehicle such as electric motors, switches or other actuators, to control braking, acceleration, steering or the like. The vehicle control system 116 may include one or more displays 222, speakers 224, or other devices so that notifications to a human driver or passenger may be provided. A display 222 may include a heads-up display, dashboard display or indicator, a display screen, or any other visual indicator, which may be seen by a driver or passenger of a vehicle. The speakers 224 may include one or more speakers of a sound system of a vehicle or may include a speaker dedicated to driver notification.

It will be appreciated that the embodiments of FIGS. 1 and 2 are given by way of example only. Other embodiments may include fewer or additional components without departing from the scope of the disclosure. Additionally, illustrated components may be combined or included within other components without limitation.

In one embodiment, the automated driving/assistance system 202 is configured to control driving or navigation of a parent vehicle. For example, the automated driving/assistance system 202 may control the vehicle control actuators 220 to drive a path within lanes on a road, parking lot, driveway or other location. For example, the automated driving/assistance system 202 may determine a path based on information or perception data provided by any of the components 206-218. The sensor systems/devices 206-214 may be used to obtain real-time sensor data so that the automated driving/assistance system 202 can assist a driver or drive a vehicle in real-time.

In one embodiment, the camera systems 210 may include a plurality of cameras. For example, the camera systems 210 may include cameras facing in different directions to provide different views and different fields of view for areas near or around the vehicle. Similarly, the radar systems 206, LIDAR systems 208, and/or ultrasound systems 214 may include a plurality of sensors obtaining data from different directions around a vehicle to provide detailed information about the surroundings of a parent vehicle. In one embodiment, this data may be uploaded for remote storage, such as by one or more aggregation servers 102.

Figure 3:
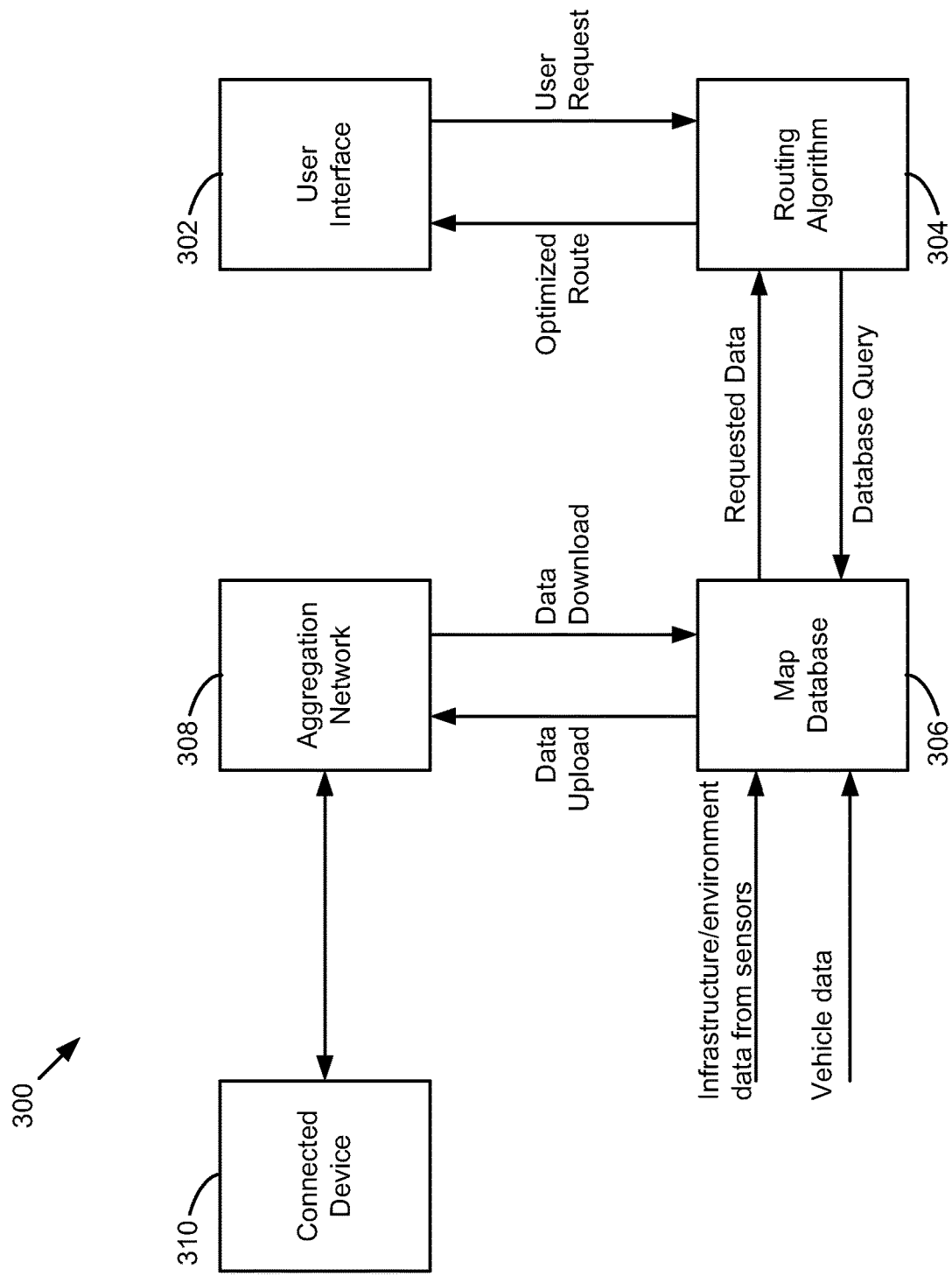
FIG. 3 is a schematic data flow diagram illustrating data flow and processing for routing a vehicle, according to one implementation.

FIG. 3 is a data flow diagram 300 illustrating data flow and processing, according to one embodiment. Using a user interface 302, a user may provide a request for navigating to a destination. The user request may be provided to a routing algorithm 304. The routing algorithm 304 generates a database query to obtain data about one or more routes between a current location and the destination. The database query is sent to a map database 306. The map database 306 provides requested data to the routing algorithm 304, which generates and sends an optimized route to the user interface 302. For example, the optimized route may include an optimized route that minimizes a cost that includes one or more of a distance cost, a time cost, a cost for reliability of a driver assistance feature or automated driving feature, or the like. For example, the optimized route may provide a short travel time while also routing the vehicle/user along roadways were a driver assistance feature or automated driving feature will be reliable.

The map database 306 includes vehicle data generated by vehicle sensors from one or more vehicles as well as infrastructure/environment data from sensors, such as infrastructure sensors or the other data sources 106 of FIG. 1. The map database 306 may upload data to an aggregation network 308 and/or download data from an aggregation network 308. The aggregation network 308 may include one or more aggregation servers 102. For example, the map database 306 may be located within a vehicle and may share collected vehicle or infrastructure data with the aggregation network so that other vehicles may access and use that data. Similarly, the map database 306 may also download data from the aggregation network 308 to utilize data that has been aggregated based on a large number of contributing vehicles or data sources. For example, the map database 306 may maintain a synchronized copy of aggregated data stored by the aggregation network 308 for an area near the vehicle or along a route to be traveled by the vehicle. The aggregated data may be stored with other map data or drive history data for usage by the routing algorithm 304.

In one embodiment, a user may access the aggregation network 308 using a connected device 310 to view the aggregated data and/or determine which driving routes are available for automated driving or assisted driving. For example, the user may plan out a route in advance such that an assisted driving feature or automated driving feature is available.

Figure 4:
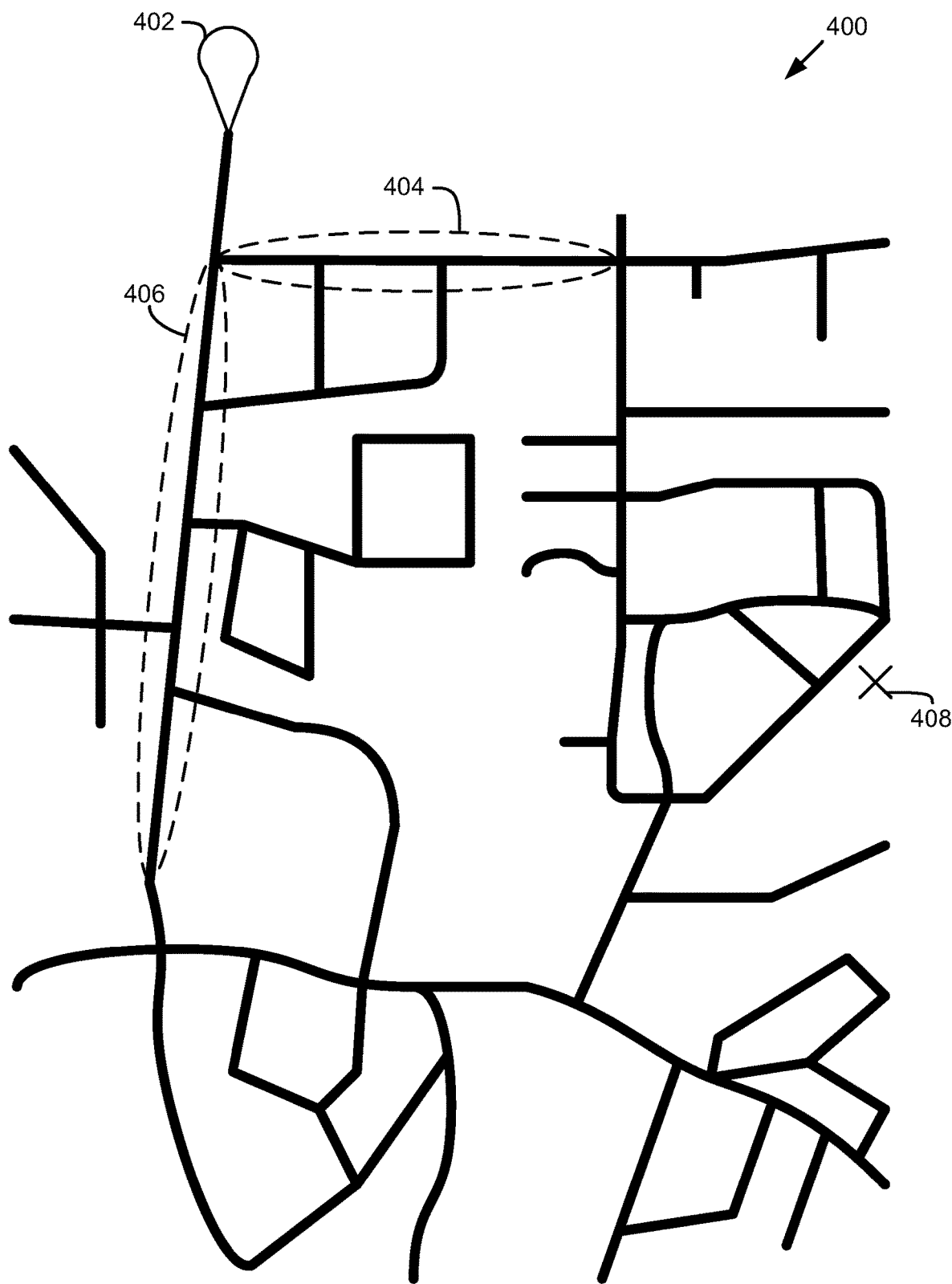
FIG. 4 illustrate a map of roadways near a current location and target destination of a vehicle, according to one implementation.

FIG. 4 illustrates a map 400 of roadways near a current location 402 of a vehicle. For example, the map 400 may illustrate roadways near the vehicle that are found in an electronic map accessible by the vehicle. The current location 402 of the vehicle may be obtained from a global navigation satellite system (GNSS) receiver, such as a Global Positioning System (GPS) receiver, Global Navigation Satellite System (GLONASS) receiver, Galilleo, or Beidou system mounted in the vehicle.

Using the current location 402, a predicted path, and/or a request from a user to navigate to a specific destination, the route optimization component 112 may determine a route to a target destination 408 based on data about sections of road on the map 400. For example, a first road section 404 may be part of a first potential route and a second road section 406 may be part of a second potential route. The route optimization component 112 may determine one or more attributes of the first road section 404 and the second road section 406. For example, the first road section 404 may include low quality lane markings and may include a driving environment that includes a large number of pedestrians (e.g., the first road section 404 may run past a school). The second road section 406 may include high quality lane markings, and a low number of pedestrians or cyclists.

In one embodiment, the route optimization component 112 may calculate the cost of a route including a cost indicating how reliable or robust a driving assistance feature or automated driving feature is likely to perform on the route. For example, the first road section 404 may have a higher cost because a driver assistance feature may not be able to operate robustly while the second road section 406 may have a lower or zero cost because a driver assistance feature will likely operate robustly, or because automated driving may be available. By determining a cost for each section of roadway within a potential route between the current location 402 and the target destination 408, the route optimization component 112 may select a lowest cost route or a route that allows for a minimum amount of time that an automated driving feature or assisted driving feature is not available. For example, the route optimization component 112 may select a route that includes the second road section 406 even if it is part of a longer overall route. For example, the selected route may be longer, but not so long so as to counterbalance the reduced cost of having automated driving or driver assistance available on the route.

In one embodiment, the route optimization component 112 may obtain attributes from different road sections from a drive history, electronic map, or any other source. For example, the route optimization component 112 may obtain any of the data available from the map database 306 of FIG. 3 or the aggregated data stored in the data store 114 of FIG. 1. Example data may include information about road bumpiness, a presence of lane markings, a lane marking quality, an indication of vehicle traffic levels, an indication of presence of pedestrians, a road curvature, or an accident history for a section of roadway. The route optimization component 112 may also account for other factors in a route cost including current weather, shortest travel time, shortest distance, or the like.

Figure 5A:
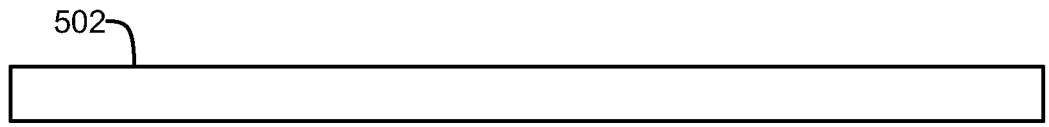
FIGS. 5A and 5B are top views of example lane markings, according to one implementation.
Figure 5B:

FIGS. 5A and 5B illustrate example lane marking qualities. FIG. 5A illustrates a top view of a high quality lane marking 502. For example, the lane marking 502 has clear boundaries, straight lines, and sharp corners, thereby providing high quality to an automated driving system or a driver assistance system. The lane marking 502 may also have a high level of contrast with a road surface, well-defined geometry, and a thickness that allows it to be easily detected by an automated driving system or a driver assistance system. FIG. 5B illustrates a top view of a low quality lane marking 504. For example, the lane marking 504 may have lost or worn paint, may be comprised mostly of a thin width, or may be otherwise difficult for an automated driving system or a driver assistance system to detect. Vehicles driving on a roadway where the lane markings are high quality, similar to the lane marking 502 in FIG. 5A, may store an indication that the roadway has high quality lane markings 502 and may upload the indication of high lane marking quality to a network location to be stored as aggregated data accessible later and by other vehicles. Vehicles driving on a roadway where the lane markings are low quality, similar to the lane marking 504 in FIG. 5B, may store an indication that the roadway has low quality lane markings 504 and may upload the indication of low lane marking quality to a network location to be stored as aggregated data accessible later and by other vehicles. As a further example, vehicles may also detect when no lane markings are present or when lane markings only include reflective lane markings. For example, some automated driving systems or driver assistance systems may not be able to operate robustly when there are no lane markings or when only reflective lane markings are included.

The vehicles, in addition to storing an indication of lane marking quality, may also store an indication of lane marking type (painted line and/or reflectors), lane marking color, lane marking geometry, or the like. The vehicles may also store an indication of how visible/detectable the lane markings are for different weather or time-of-day conditions. For example, some lane lines may be visible during good weather or day-time hours, but may be difficult to detect during bad weather or night-time hours. The vehicles may also store an indication of road curvature, steepness of the roadway, road bumpiness, traffic levels for a current time of day, or any other information about a roadway or driving environment. This information may be stored locally and/or may be uploaded for storage at a remote location accessible via a communications network.

Figure 6:
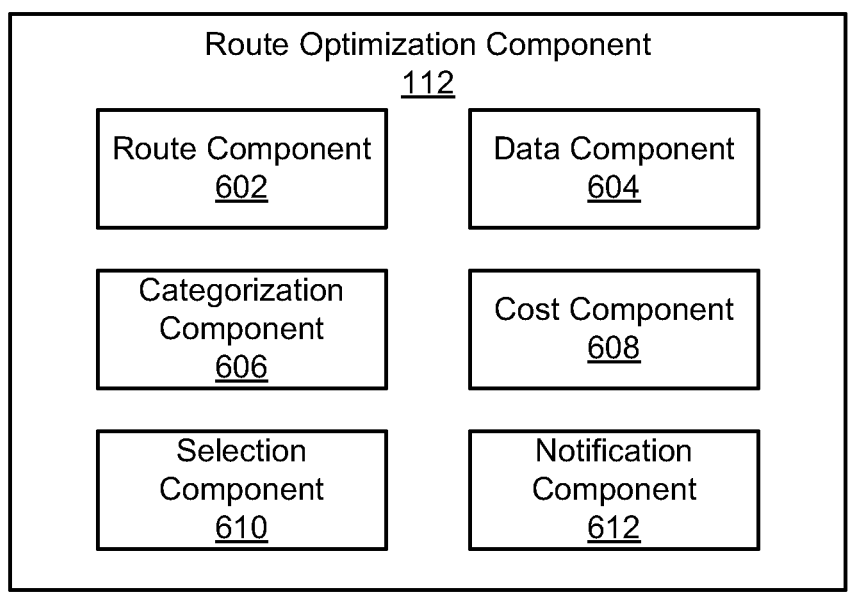
FIG. 6 is a schematic block diagram illustrating example components of a route optimization component, according to one implementation.

FIG. 6 is a block diagram illustrating example components of a route optimization component 112, according to one implementation. In the depicted embodiment, the route optimization component 112 may comprise a route component 602, a data component 604, a categorization component 606, a cost component 608, a selection component 610, and a notification component 612. The components 602-612 are given by way of illustration only and may not all be included in all embodiments. In fact, some embodiments may include only one or any combination of two or more of the components 602-612. Furthermore, some of the components 602-612 may be located outside the route optimization component 112, such as within an automated driving/assistance system 202 or aggregation server 102.

The route component 602 is configured to identify one or more driving routes between a current location of a vehicle and a destination. For example, the route component 602 may receive an indication of a target destination for the vehicle, such as a target destination indicated by a user or human driver, or as predicted by a route prediction or destination prediction algorithm. The route component 602 may also receive an indication of the current location of the vehicle as determined by a GPS system, such as 212 of FIG. 2, or other positioning system. In one embodiment, the route component 602 may identify two or more driving routes that provide a driving distance or driving time within a percentage distance or time of the shortest distance route or a shortest driving time route.

The data component 604 is configured to obtain road data or driving environment data for one or more sections of road between the current location and the target destination. For example, the data component 604 may obtain data for each section of road within the one or more driving routes identified by the route component 602. The data component 604 may obtain the data from a local map database, and/or from a remote storage location storing aggregated data from a plurality of vehicles or data sources. In one embodiment, the data component 604 may obtain information about one or more of a road bumpiness, a presence of lane markings, a lane marking quality, an indication of vehicle traffic levels, an indication of presence of pedestrians, a road curvature, or an accident history for each section of roadway within a potential driving route or nearby section of road. The information may also include information about road type (e.g., interstate, highway, city road, or the like) as well as information about speed limit. In one embodiment, if a section of roadway has no corresponding data, the data component 604 may fill in attributes with default values or with the worst possible value attributable to the road type.

In one embodiment, the data component 604 provides the data about the road or driving environment to a control system, driver, or other portion of a vehicle for optimizing driving. For example, the data component 604 may provide aggregated data corresponding to a location along the route to the driver, automated driving system, or driver assistance system of the vehicle before the vehicle arrives at the location to prepare the vehicle for the driving conditions at the location or begin preparing a driving path through that location. In one embodiment, the data component 604 provides the data to other components of the route optimization component 112 to determine sections of road for which an assisted driving feature or automated driving feature will be available or unavailable.

In one embodiment, the data obtained by the data component 604 may include information about lane markings. For example, the data component 604 may obtain indications of lane marking quality for one or more sections of road within the one or more driving routes. The indications of lane marking quality may include one or more of an indication of lane marking geometry, an indication of lane marking type, or an indication of lane marking color. This information may be used by the route optimization component 112 to determine where specific assisted driving features or automated driving features will be available.

The categorization component 606 is configured to determine whether an automated driving feature or assisted driving feature of the vehicle will be able to operate robustly for a specific section of road. For example, the categorization component 606 may determine whether operation is likely to be reliable based on data obtained by the route component 602 and/or the data component 604. In one embodiment, the categorization component 606 is configured to categorize sections of road as reliable (reliable category) or unreliable (unreliable category) for one or more automated driving features or the driver assistance features of the vehicle. In one embodiment, the categorization component 606 may determine a reliability of the automated driving feature or the driver assistance feature for a section of roadway. For example, the reliability of the features may be rated within a ranking system to provide a numerical (such as a value from 1 to 10) or other value indicating whether the features will be highly reliable.

The categorization component 606 may use data aggregated by an aggregation server 102 or local data stored by the vehicle. The categorization component 606 may also use data about the vehicle, such as the vehicle type, information about the sensing system of the vehicle, or information about a control system of the vehicle, to determine a categorization. For example, some sensing systems may be able to more reliably detect environmental conditions than others. Similarly, some control systems or vehicles may be able to operate more reliably within different environmental or driving conditions. As yet another example, the reliability may also be based on a human driver and how they like to drive and what conditions they wish to avoid. Thus, the reliability determined by the categorization component 606 may be specific to the vehicle and/or a driver of the vehicle.

The cost component 608 is configured to determine a route cost for each of the routes identified by the route component 602 and/or the reliability or category determined by the categorization component 606. For example, the cost component 608 may determine a route cost for a route based on aggregated drive data based on reliability of an automated driving feature or driver assistance feature. The cost component 608 may determine the route costs based on a sensing system, control system, and/or a vehicle type of the vehicle. The cost component 608 may determine the route cost based on predicted feature reliability (based on aggregated or local data) in combination with any other route cost.

Examples of other route costs include current traffic conditions, current weather conditions, route total driving time, route total distance, or the like. In one embodiment, the cost component 608 may determine a feature reliability cost for each section of roadway and sum those costs to compute an overall feature reliability cost for the whole route. In one embodiment, the feature reliability cost for a section of roadway or a route may depend on current weather or current traffic.

In one embodiment, the cost component 608 may determine a route cost based on lane markings, such as their presence or absence or quality. For example, local storage or remote storage may include an indication of lane marking quality, lane marking geometry, lane marking type, lane marking color, and/or lane marking type (e.g., painted line or reflector). In one embodiment, the cost component 608 may determine the route cost based on calculating a sum of the lane marking quality for each section of road along the corresponding route. The cost component 608 may determine whether a section of roadway has a good lane marking quality based on data obtained by the data component 604 and/or a categorization or reliability provided by the categorization component 606. In one embodiment, the cost component 608 may determine whether lane markings for a section of road along the route are detectable by an automated driver system or driver assistance system. If the lane markings are not detectable, then the automated driving or assisted driving features may not be available and it may be desirable to avoid those areas, given that other route costs are not substantially increased. In one embodiment, the route cost component 608 determines the route cost based on indications of lane marking quality obtained from local or remote storage for sections of road within the route.

The cost component 608 may determine a total route cost for a route that includes a weighted sum or weighted product (using multiplied terms) of costs for a plurality of different cost factors. For example, the total route cost may be calculated by summing or multiplying a feature reliability cost, a distance cost, a travel time cost, or any other cost together. Each cost within the total route cost may include a weighting factor by which it is multiplied so that an appropriate weighting is applied. For example, a driver or passenger may not wish to take a route that has high feature reliability and a two hour longer travel time. The weighting factors may provide balance in how the different costs affect the total cost for a route so that an appropriate route can be selected.

The selection component 610 is configured to select a route based on route costs determined by the cost component 608. For example, the selection component 610 may select a route from one or more potential routes based on the route having a lowest route cost of all the potential routes. In one embodiment, the selection component 610 may select a route with a roadway that has the highest percentage of high lane marking quality. In one embodiment, the selection component 610 may receive an indication from a user for which route is selected. For example, the notification component 612 may present the one or more potential routes and their associated route costs to a user. The user may be able to review the potential routes and select one of them to follow. For example, the user may decide that they want a route where automated driving features or assisted driving features are available for the whole route or for most of the route. The user may provide a selection of a route that maximizes the availability (e.g., reliability) of automated driving features or assisted driving features and the selection component 610 may select that route for traveling between a current location and a target destination.

The notification component 612 is configured to provide information about a selected route or one or more potential driving routes to a human user or a control system of the vehicle. For example, the notification component 612 may provide a view of a map with a selected route highlighted or otherwise identified. The notification component 612 may also provide highlights or other identifying information for non-selected routes, which can then be selected and/or viewed by a driver or passenger. For example, the driver or passenger may view each route one-by-one to determine which route the user likes best. The user may then select that route and begin navigation to a target destination. In one embodiment, the notification component may provide information about a selected route to a driver, automated driving system, or driver assistance system for following the route. For example, a navigation system may provide instructions to a human driver on how to follow the route or may provide instructions to a control system or automated driving system on how to follow the route.

The route optimization component 112 may allow for routing based on whether automated or assisted driving features will be available on a route. As indicated by broken lines in FIGS. 1 and 2, the route optimization component 112 may be located locally with a vehicle or remotely from the vehicle. For example if the route optimization component 112 is located in or with the vehicle, map data or aggregated data may be stored locally or remotely and the route optimization component 112 may obtain this data and determine a route locally. As another example, if the route optimization component 112 is located remotely from the vehicle (e.g., at an aggregation server 102), the data may be stored locally or remotely and the route optimization component 112 may obtain this data and determine a route remotely and send the route details to the vehicle for navigation.

Referring now to FIG. 7, a schematic flow chart diagram of a method 700 for routing a vehicle is illustrated. The method 700 may be performed by a route optimization component, a control system, or an aggregation server, such as a route optimization component 112 in any of FIG. 1, 2, or 6, a control system 116 as in any of FIG. 1 or 2, or an aggregation server 102 as in FIG. 1.

The method 700 begins and a route component 602 identifies at 702 one or more driving routes between a current location of a vehicle and a destination. A cost component 604 determines at 704 a route cost for the one or more driving routes based on lane marking quality of a roadway within a corresponding driving route. A selection component 610 selects at 706 a route of the one or more routes with a lowest route cost. A notification component 612 provides information at 708 about the route to a driver or control system for following the route.

Examples

The following examples pertain to further embodiments.

Example 1 is a method that includes identifying one or more driving routes between a current location of a vehicle and a destination. The method includes determining a route cost for the one or more driving routes based on lane marking quality of a roadway within a corresponding driving route. The method includes selecting a route of the one or more routes with a lowest route cost. The method further includes providing information about the route to a driver or control system for following the route.

In Example 2, determining a route cost for the corresponding route in Example 1 includes calculating a sum of a function of lane marking quality for each section of road along the corresponding route.

In Example 3, determining a route cost for the corresponding route in any of Examples 1-2 includes determining whether each section of road along a road comprises a good lane marking quality.

In Example 4, determining a route cost for the corresponding route in any of Examples 1-3 includes determining whether lane markings for one or more sections of road along the route are detectable by an automated driver system or driver assistance system.

In Example 5, selecting the route with the lowest route cost in any of Examples 104 includes selecting a route with a highest percentage of roadway with a good lane marking quality.

In Example 6, a method as in any of Examples 1-5 further includes obtaining indications of lane marking quality for one or more sections of road within the one or more driving routes, wherein determining the route cost comprises determining based on the indications of lane marking quality.

In Example 7, obtaining the indications of lane marking quality in Example 6 includes retrieving the indications of lane marking quality from storage comprising one or more of: a remote storage accessible over a network; locally stored map data; or locally stored vehicle history data.

In Example 8, the indications of lane marking quality in any of Examples 6-7 include one or more of an indication of lane marking geometry, an indication of lane marking type, or an indication of lane marking color, wherein determining the route cost comprises determining based on one or more of the indication of lane marking geometry, the indication of lane marking type, or the indication of lane marking color.

In Example 9, determining the route cost in any of Examples 1-8 includes determining the route cost further based on one or more of current weather or current traffic.

Example 10 is a system that includes a route component, a cost component, a selection component, and a notification component. The route component is configured to identify one or more driving routes between a current location of a vehicle and a destination. The cost component is configured to determine a route cost for the one or more driving routes based on lane marking quality of a roadway within a corresponding driving route. The selection component is configured to select a route of the one or more routes with a lowest route cost. The notification component is configured to provide information about the route to a driver or control system for following the route.

In Example 11, the cost component in Example 10 determines a route cost for the corresponding route by calculating a sum of a function of lane marking quality for each section of road along the corresponding route.

In Example 12, the cost component in any of Examples 10-11 determines a route cost for the corresponding route by determining whether each section of road along a route comprises a good lane marking quality.

In Example 13, the cost component in any of Examples 10-12 determines a route cost for the corresponding route by determining whether lane markings for one or more sections of road along the route are detectable by an automated driver system or driver assistance system.

In Example 14, the selection component in any of Examples 10-13 selects the route with the lowest route cost by selecting a route with a highest percentage of roadway with lane markings detectable by the vehicle.

In Example 15, the system of Example 10 further includes an indication component configured to obtain indications of lane marking quality for one or more sections of road within the one or more driving routes, wherein the indication component obtains the indications of lane marking quality from storage comprising one or more of: a remote storage accessible over a network; locally stored map data; or locally stored vehicle history data; wherein the cost component is configured to determine the route cost based on the indications of lane marking quality.

Example 16 computer readable storage media storing instructions that, when executed by one or more processors, cause the processors to identify one or more driving routes between a current location of a vehicle and a destination. The instructions cause the processors to obtain indications of lane marking quality for one or more sections of road within the one or more driving routes. The instructions cause the processors to determine a route cost for the one or more driving routes based on lane marking quality of a roadway within a corresponding driving route. The instructions cause the processors to select a route of the one or more routes with a lowest route cost. The instructions cause the processors to provide information about the route to a driver or control system for following the route.

In Example 17, the instructions in Example 16 further cause the processors to determine a route cost for the corresponding route by determining whether each section of road along a road comprises a good lane marking quality.

In Example 18, the instructions in any of Examples 16-17 further cause the processors to determine a route cost for the corresponding route by determining whether lane markings for one or more sections of road along the route are detectable by an automated driver system or driver assistance system.

In Example 19, the instructions in any of Example 16-18 further cause the processors to select the route with the lowest route cost by selecting a route with a highest percentage of roadway with a good lane marking quality.

In Example 20, the indications of lane marking quality in any of Examples 16-19 include one or more of an indication of lane marking geometry, an indication of lane marking type, or an indication of lane marking color, wherein determining the route cost comprises determining based on one or more of the indication of lane marking geometry, the indication of lane marking type, or the indication of lane marking color.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
   receiving a request to identify a route to a target destination to be travelled by a vehicle;
   accessing a map database comprising route information for one or more roadways, wherein the route information comprises a Boolean metric indicating whether a quality of a road feature is unsatisfactory or satisfactory for detecting the road feature with a sensor of the vehicle;
   calculating a reliability of a driver assistance feature on at least one of the one or more roadways based on the Boolean metric for the route information and further based on current weather information; and
   selecting an optimal driving route to the target destination by prioritizing roadways with a higher reliability of the driver assistance feature.

2. The method of claim 1, wherein the road feature comprises a road lane marker;
   wherein the Boolean metric represents whether the quality of the road lane marker is unsatisfactory or satisfactory for detecting the road lane marker with the sensor of the vehicle when traveling the one or more roadways; and
   wherein the Boolean metric is determined based on one or more of road curvature where the road lane marker is present, a geometry of the road lane marker, a type of road lane marker, or a color of the road lane marker.

3. The method of claim 1, wherein the road feature route information comprises a road lane marker, and wherein the method further comprises calculating a cost of a potential driving route based on the Boolean metric representing the quality of the road lane marker.

4. The method of claim 3, wherein the route information further comprises current traffic, and wherein calculating the cost of the potential driving route further comprises calculating a dynamic cost of the potential driving route based on current traffic on the one or more roadways.

5. The method of claim 1, wherein selecting the optimal driving route comprises:
   determining two or more potential driving routes comprising a first route along which the driver assistance feature will not be available and a second route along which the driver assistance feature will be available; and
   selecting the second route based on the driver assistance feature being available.

6. The method of claim 5, further comprising determining whether the driver assistance feature will be available on the first route or the second route based at least in part on a likelihood that the sensor of the vehicle will detect the road feature, wherein the likelihood is determined based on the Boolean metric for the road feature.

7. The method of claim 1, wherein accessing the map database comprises retrieving information from one or more of:
   remote storage accessible over a network;
   locally stored map data; or
   locally stored vehicle history data.

8. The method of claim 1, wherein the route information stored on the map database comprises one or more of: road curvature, steepness of a roadway, road bumpiness, driving infrastructure built into a roadway, road materials, road lane marker geometry, road lane marker type, road lane marker color, traffic levels for a current time of day, or a likelihood of pedestrians; and wherein the Boolean metric represents whether the quality of a road lane marker on the one or more roadways is unsatisfactory or satisfactory for detecting the road lane marker with the sensor of the vehicle.

9. The method of claim 1, wherein selecting the optimal driving route comprises selecting a potential driving route wherein the driver assistance feature or an automated driving feature will be available.

10. The method of claim 1, wherein the driver assistance feature comprises one or more of collision avoidance, automated driving, or lateral and longitudinal control of a vehicle with respect to a roadway.

11. A system comprising:
a vehicle; and
a controller in communication with the vehicle, the controller comprising a processor configured to execute instructions stored in non-transitory computer readable storage medium, the instructions comprising:
receiving a request to identify a route to a target destination to be travelled by a vehicle;
accessing a map database comprising route information for one or more roadways, wherein the route information comprises a Boolean metric indicating whether a quality of a road feature is unsatisfactory or satisfactory for detecting the road feature with a sensor of the vehicle;
calculating a reliability of a driver assistance feature on at least one of the one or more roadways based on the Boolean metric for the route information and further based on current weather information; and
selecting an optimal driving route to the target destination by prioritizing roadways with a higher reliability of the driver assistance feature.

12. The system of claim 11, wherein the road feature comprises a road lane marker;
wherein the Boolean metric represents whether the quality of the road lane marker is unsatisfactory or satisfactory for detecting the road lane marker with the sensor of the vehicle when traveling the one or more roadways; and
wherein the Boolean metric is determined based on one or more of road curvature where the road lane marker is present, a geometry of the road lane marker, a type of road lane marker, or a color of the road lane marker.

13. The system of claim 11, wherein the road feature comprises a road lane marker, and wherein the method further comprises calculating a cost of a potential driving route based on the Boolean metric representing the quality of the road lane marker.

14. The system of claim 13, wherein the route information further comprises current traffic, and wherein calculating the cost of the potential driving route further comprises calculating a dynamic cost of the potential driving route based on the current traffic on the one or more roadways.

15. The system of claim 11, wherein the instructions are such that selecting the optimal driving route comprises:
determining two or more potential driving routes comprising a first route along which the driver assistance feature will not be available and a second route along which the driver assistance feature will be available; and
selecting the second route based on the driver assistance feature being available.

16. Non-transitory computer readable storage medium storing instructions for execution by one or more processors, the instructions comprising:
receiving a request to identify a route to a target destination to be travelled by a vehicle;
accessing a map database comprising route information for one or more roadways, wherein the route information comprises a Boolean metric indicating whether a quality of a road feature is unsatisfactory or satisfactory for detecting the road feature with a sensor of the vehicle;
calculating a reliability of a driver assistance feature on at least one of the one or more roadways based on the Boolean metric for the route information and further based on current weather information; and
selecting an optimal driving route to the target destination by prioritizing roadways with a higher reliability of the driver assistance feature.

17. The non-transitory computer readable storage medium of claim 16, wherein the instructions are such that selecting the optimal driving route comprises:
determining two or more potential driving routes comprising a first route along which the driver assistance feature will not be available and a second route along which the driver assistance feature will be available; and
selecting the second route based on the driver assistance feature being available.

18. The non-transitory computer readable storage medium of claim 17, wherein the instructions further comprise determining whether the driver assistance feature will be available on the first route or the second route based at least in part on a likelihood that the sensor of the vehicle will detect the road feature, wherein the likelihood is determined based on the Boolean metric for the road feature.

19. The non-transitory computer readable storage medium of claim 16, wherein the instructions are such that accessing the map database comprises retrieving information from one or more of:
remote storage accessible over a network;
locally stored map data; or
locally stored vehicle history data.

20. The non-transitory computer readable storage medium of claim 16, wherein the route information stored on the map database comprises one or more of: road curvature, steepness of a roadway, road bumpiness, driving infrastructure built into a roadway, road materials, road lane marker geometry, road lane marker type, road lane marker color, traffic levels for a current time of day, or a likelihood of pedestrians; and
wherein the Boolean metric represents whether the quality of a road lane marker on the one or more roadways is unsatisfactory or satisfactory for detecting the road lane marker with the sensor of the vehicle.

* * * * *

UNITED STATES PATENT AND TRADEMARK OFFICE
CERTIFICATE OF CORRECTION

PATENT NO. : 11,821,740 B2
APPLICATION NO. : 17/096682
DATED : November 21, 2023
INVENTOR(S) : Brett Stephens et al.

It is certified that error appears in the above-identified patent and that said Letters Patent is hereby corrected as shown below:

In the Specification

In Column 14, Line 35, "route information" should be removed.

Signed and Sealed this
Twentieth Day of February, 2024

Katherine Kelly Vidal
*Director of the United States Patent and Trademark Office*